United States Patent
Bossen

(10) Patent No.: US 10,721,481 B2
(45) Date of Patent: *Jul. 21, 2020

(54) METHOD AND APPARATUS FOR MOTION COMPENSATION PREDICTION

(71) Applicant: NTT DOCOMO, INC., Chiyoda-ku, Tokyo (JP)

(72) Inventor: Frank Jan Bossen, Mountain View, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,664

(22) Filed: Nov. 30, 2018

(65) Prior Publication Data

US 2019/0098319 A1    Mar. 28, 2019

Related U.S. Application Data

(63) Continuation of application No. 15/795,658, filed on Oct. 27, 2017, now Pat. No. 10,171,816, which is a
(Continued)

(51) Int. Cl.
*H04N 7/12* (2006.01)
*H04N 11/02* (2006.01)
(Continued)

(52) U.S. Cl.
CPC ......... *H04N 19/169* (2014.11); *H04N 19/184* (2014.11); *H04N 19/42* (2014.11); *H04N 19/523* (2014.11); *H04N 19/82* (2014.11)

(58) Field of Classification Search
CPC .... H04N 19/169; H04N 19/184; H04N 19/42; H04N 19/523; H04N 19/82
See application file for complete search history.

(56) References Cited

U.S. PATENT DOCUMENTS

| 6,282,243 B1 | 8/2001 | Kazui et al. |
| 10,171,816 B2 | 1/2019 | Bossen |

(Continued)

FOREIGN PATENT DOCUMENTS

| EP | 1290896 A1 | 3/2003 |
| EP | 1 353 514 A2 | 10/2003 |

(Continued)

OTHER PUBLICATIONS

International Search Report for International Application No. PCT/US2012/043674, dated Sep. 21, 2012, 1 page.
(Continued)

*Primary Examiner* — Jamie J Atala
*Assistant Examiner* — Patrick E Demosky
(74) *Attorney, Agent, or Firm* — Brinks Gilson & Lione

(57) ABSTRACT

The invention relates to a motion compensation performed under an inter-frame prediction. A fractional sample interpolation is applied on retrieved samples to generate fractional samples. The fractional sample interpolation comprises a plurality of filtering operations, and all of filtered results from the filtering operations are truncated down to a predetermined bit depth independent of the bit depth of the samples stored in the reference picture memory.

7 Claims, 7 Drawing Sheets

Related U.S. Application Data continuation of application No. 14/126,734, filed as application No. PCT/US2012/043674 on Jun. 22, 2012, now Pat. No. 9,860,532.

(60) Provisional application No. 61/501,112, filed on Jun. 24, 2011.

(51) Int. Cl.
```
H04N 19/169    (2014.01)
H04N 19/184    (2014.01)
H04N 19/82     (2014.01)
H04N 19/42     (2014.01)
H04N 19/523    (2014.01)
```

(56) References Cited

U.S. PATENT DOCUMENTS

| | | |
|---|---|---|
| 2001/0026590 A1 | 10/2001 | Kang et al. |
| 2003/0169819 A1 | 9/2003 | Kutka et al. |
| 2004/0076333 A1 | 4/2004 | Zhang et al. |
| 2008/0247467 A1* | 10/2008 | Rusanovskyy ......... H04N 7/12 375/240.16 |
| 2008/0310509 A1* | 12/2008 | Goel ................. H04N 19/176 375/240.16 |
| 2008/0310519 A1 | 12/2008 | Seyedi-Esfahani et al. |
| 2009/0063599 A1 | 3/2009 | Reznik |
| 2009/0097763 A1* | 4/2009 | Chiu ....................... H04N 1/64 382/238 |
| 2009/0238279 A1* | 9/2009 | Tu ......................... H04N 19/30 375/240.16 |
| 2009/0296822 A1 | 12/2009 | Sandeep et al. |
| 2011/0090959 A1 | 4/2011 | Wiegand et al. |
| 2011/0268190 A1 | 11/2011 | Morphet et al. |
| 2012/0027079 A1 | 2/2012 | Ye et al. |
| 2012/0328020 A1* | 12/2012 | Lou ....................... H04N 19/61 375/240.16 |

FOREIGN PATENT DOCUMENTS

| | | |
|---|---|---|
| EP | 2 091 258 A1 | 8/2009 |
| JP | 2003-333599 A | 11/2003 |
| JP | 2004-140676 A | 5/2004 |
| JP | 2008-507190 A | 3/2008 |
| RU | 2011 149 204 A | 6/2013 |
| WO | WO 01/086963 A1 | 11/2001 |
| WO | WO 2007/114368 A1 | 10/2007 |
| WO | WO 2010/143583 A1 | 12/2010 |
| WO | WO 2011/086777 A1 | 7/2011 |
| WO | WO 2011/121716 A1 | 10/2011 |
| WO | WO 2012/005558 A2 | 1/2012 |

OTHER PUBLICATIONS

Written Opinion of the International Search Authority for International Application No. PCT/US2012/043674, dated Sep. 21, 2012, 4 pages.

Bossen, Frank, "On the Motion Compensation Process," *Joint Collaborative team on Video Coding(JCT-VC) of ITU-T SG16 WP3 and ISO/IEC JTC1/SC29/WG11*, 6$^{th}$ Meeting: Torino, Italy, Jul. 14-22, 2011, 7pages.

Office Action, and English translation thereof, in corresponding Russian Federation Application No. 2014102188/07 (003286), dated Sep. 1, 2014, 8 pages.

Chujoh, Takeshi, et al., "Internal Bit Depth Increase Except Frame Memory", *ITU-Telecommunications Standardization Sector*, Study Group 16 Question 6, Video Coding Experts Group (VCEG), 32$^{nd}$ Meeting: San Jose, USA, Apr. 20-21, 2007, Document VCEG-AF07, 4 pages.

Wiegand, Thomas et al.,"WD3: Working Draft 3 of High-Efficiency Video Coding," *Joint Collaborative Team of Video Coding (JCT-VC) of ITU-T SG16 WP3 and ISO/IEC JTC1/SC29/WG11*, 5$^{th}$ Meeting: Geneva, Switzerland, Mar. 16-23, 2011, Document JCTVC-E603, pp. 1-160 (in two attachments—E3a and E3b).

Ye, Yan, "High Precision Interpolation and Prediction," *ITU-Telecommunications Standardization Sector*, Study Group 16 Question 6, Video Coding Experts Group (VCEG), 35$^{th}$ Meeting: Berlin, Germany, Jul. 16-18, 2008, Document VCEG-Al33, 4 pages.

Extended European Search Report in corresponding European Application No. 12803489.9, dated Oct. 7, 9 pages.

Office Action and Search Report, and English language translation thereof, in corresponding Chinese Application No. 201280031173.9, dated May 5, 2015, 16 pages.

Examination Report in corresponding Canadian Application No. 2,839,704, dated Jun. 12, 2015, 4 pages.

Bross, Benjamin et al., "WD5: Working Draft 5 of High-Efficiency Video Coding," *Joint Collaborative Team on Video Coding (JCT-VC) of ITU-T SG16 WP3 and ISO/IEC JTC1/SC29/WG11*, 7$^{th}$ Meeting: Geneva, Switzerland, Nov. 21-30, 2011, Document JCTVC-G1103-d9, pp. title, 25, 26, 55-59, 123, 124.

Notice of Reasons for Rejection, and English language translation thereof, in corresponding Japanese Application No. 2014-152268, dated Jul. 14, 2015, 10 pages.

Alshina, Elena et al., "CE3: 7 taps interpolation filters for quarter pet position MC from Samsung and Motorola Mobility," *Joint Collaborative Team on Video Coding (JCT-VC) of ITU-T SG16 WP3 and ISO/IEC JTC1/SC29/WG11*, 7$^{th}$ Meeting: Geneva, Switzerland, Nov. 21-30, 2011, Document JCTVC-G778, Nov. 9, 2011, 9 pages, XP030110762.

Wiegund, Thomas et al., "WD3: Working Draft 3 of High-Efficiency Video Coding (with changes by Bossen F)," *Joint Collaborative Team on Video Coding (JCT-VC) of ITU-T SG16 WP3 and ISO/IEC JTC1/SC29/WG11*, 5$^{th}$ Meeting: Geneva, Switzerland, Mar. 16-23, 2011, Document JCTVC-E603, Annex to HCTVC-F537 excerpts of JCTVC-F537 d8f_F537.doc, Jul. 6, 2011, XP002742961.

Extended European Search Report in European Application No. 15163455.7, dated Aug. 12, 2015, 8 pages.

Notification of Reasons for Refusal, and English language translation thereof, in corresponding Japanese Application No. 2014-152268, dated Sep. 30, 2015, 11 pages.

Office Action in corresponding Canadian Application No. 2,839,704, dated Mar. 2, 2016, 4 pages.

Office Action, and English language translation thereof, in corresponding Korean Application No. 10-2013-7032807, dated May 2, 2016, 7 pages.

Office Action, and English language translation thereof, in corresponding Japanese Application No. 2015-177699, dated Aug. 16, 2016, 9 pages.

Shah, S. et al., "Distributed Arithmetic for the Design of High Speed FIR Filter Using FPGAs", *Chameleon Logics 301*, 2009, 9 pages.

Wiegand, T, et al., "WD3: Working Draft 3 of High-Efficiency Video Coding", *Joint Collaborative Team on Video Coding (JCT-VC) of ITU-T SG16 WP3 and ISO/IEC JTC1/SC29/WG11*, 5$^{th}$ Meeting: Geneva, CH, Mar. 2011, 7 pages.

Office Action in corresponding Canadian Application No. 2,839,704, dated Oct. 4, 2016, 5 pages.

Office Action in corresponding Canadian Application No. 2,904,551, dated Oct. 13, 2016, 4 pages.

Office Action, and English language translation thereof, in corresponding Japanese Application No. 2015-177699, dated Nov. 1, 2016, 9 pages.

Wiegand, T, et al., "WD1 Working Draft 1 of High Efficiency Video Coding", *Joint Collaborative Team on Video Coding*, 3$^{rd}$ Meeting JCTVC-C403, Oct. 2010, 137 pages.

Office Action, and English language translation thereof, in corresponding Korean Application No. 10-2016-7017300, dated Oct. 20, 2016, 7 pages.

Office Action, and English language translation thereof, in corresponding Korean Application No. 10-2016-7017302, dated Oct. 24, 2016, 7 pages.

Office Action in corresponding European Application No. 12803489.9, dated Dec. 6, 2016, 5 pages.

Office Action, and English language translation thereof, in corresponding Russian Application No. 2016113727, dated Jan. 30, 2017, 9 pages.

(56) References Cited

OTHER PUBLICATIONS

Office Action, and English language translation thereof, in corresponding Korean Application No. 10-2017-7015861, dated Jul. 27, 2017, 7 pages.
Office Action, and English language translation thereof, in corresponding Chinese Application No. 201510462973.1, dated Aug. 14, 2017, 12 pages.
Office Action in Korean Application No, 10-2018-7012281 dated Jul. 4, 2018, pages 1-7.
Office Action in Indian Application No. 9255/CHENP/2013, dated Aug. 24, 2018, pages 1-6.
Office Action in U.S. Appl. No. 16/206,672, dated Aug. 20, 2019, 17 pages.
Office Action in Europe Application No. 12803489.9, dated Sep. 30, 2019, 7 pages.
Office Action in Japan Application No. P2019-002663, dated Jan. 21, 2020, 9 pages.
Takeshi Chujoh, et al., "Description of video coding technology proposal by TOSHIBA", Joint Collaborative Team on Video Coding (JCT-VC) of ITU-T SG16 WP3 and ISO/IEC JTC1/SC29/WG11, 1st meeting: Dresden, DE, Apr. 15-Apr. 23, 2010, JCTVC-A117, Apr. 2010, p. 1-p. 6, 7 pages.

* cited by examiner

| $A_{-1,-1}$ | | | | $A_{0,-1}$ | $a_{0,-1}$ | $b_{0,-1}$ | $c_{0,-1}$ | $A_{1,-1}$ | | | | $A_{2,-1}$ |
|---|---|---|---|---|---|---|---|---|---|---|---|---|
| | | | | | | | | | | | | |
| | | | | | | | | | | | | |
| | | | | | | | | | | | | |
| $A_{-1,0}$ | | | | $A_{0,0}$ | $a_{0,0}$ | $b_{0,0}$ | $c_{0,0}$ | $A_{1,0}$ | | | | $A_{2,0}$ |
| $d_{-1,0}$ | | | | $d_{0,0}$ | $e_{0,0}$ | $f_{0,0}$ | $g_{0,0}$ | $d_{1,0}$ | | | | $d_{2,0}$ |
| $h_{-1,0}$ | | | | $h_{0,0}$ | $i_{0,0}$ | $j_{0,0}$ | $k_{0,0}$ | $h_{1,0}$ | | | | $h_{2,0}$ |
| $n_{-1,0}$ | | | | $n_{0,0}$ | $p_{0,0}$ | $q_{0,0}$ | $r_{0,0}$ | $n_{1,0}$ | | | | $n_{2,0}$ |
| $A_{-1,1}$ | | | | $A_{0,1}$ | $a_{0,1}$ | $b_{0,1}$ | $c_{0,1}$ | $A_{1,1}$ | | | | $A_{2,1}$ |
| | | | | | | | | | | | | |
| | | | | | | | | | | | | |
| | | | | | | | | | | | | |
| $A_{-1,2}$ | | | | $A_{0,2}$ | $a_{0,2}$ | $b_{0,2}$ | $c_{0,2}$ | $A_{1,2}$ | | | | $A_{2,2}$ |

Fig. 7

METHOD AND APPARATUS FOR MOTION COMPENSATION PREDICTION

RELATED APPLICATIONS

This application is a continuation application of U.S. application Ser. No. 15/795,658 filed Oct. 27, 2017, which is a continuation application of U.S. application Ser. No. 14/126,734 filed Dec. 16, 2013, which is a 371 application of PCT/US2012/043674 having an international filing date of Jun. 22, 2012, which claims the benefit of the filing date under 35 U.S.C. § 119(e) of Provisional U.S. Patent Application Ser. No. 61/501,112, filed Jun. 24, 2011, the entire content of which is incorporated herein by reference.

BACKGROUND OF THE INVENTION

1. Field of the Invention

The present invention relates to a motion compensation for an inter-frame prediction and in particular to a fractional sample interpolation used in the motion compensation which and achieves low complexity and high precision.

2. Description of the Related Art

Digital video requires a large amount of data to represent each and every frame of a digital video sequence (e.g., series of frames) in an uncompressed manner. It is not feasible for most applications to transmit uncompressed digital video across computer networks because of bandwidth limitations. In addition, uncompressed digital video requires a large amount of storage space. The digital video is normally encoded in some manner to reduce the storage requirements and reduce the bandwidth requirements.

One technique for encoding digital video is inter-frame prediction, or inter-prediction. Inter-prediction exploits temporal redundancies among different frames. Temporally adjacent frames of video typically include blocks of pixels, which remain substantially the same. During the encoding process, a motion vector interrelates the movement of a block of pixels in one frame to a block of similar pixels in another frame. Accordingly, the system is not required to encode the block of pixels twice, but rather encodes the block of pixels once and provides a motion vector to predict the other block of pixels.

Another technique for encoding digital video is intra-frame prediction or intra-prediction. Intra-prediction encodes a frame or a portion thereof without reference to pixels in other frames. Intra-prediction exploits spatial redundancies among blocks of pixels within a frame. Because spatially adjacent blocks of pixels generally have similar attributes, the efficiency of the coding process is improved by referencing the spatial correlation between adjacent blocks. This correlation may be exploited by prediction of a target block based on prediction modes used in adjacent blocks.

In the inter-prediction, a received picture is predicted, based on motion estimation and compensation. Moving objects in video often appear from frame to frame with which all or part of it are relocated in those subsequent frames. Despite those relocations, correlation among the sequence of the frames is high and gives rise to redundancy. This temporal redundancy can be reduced by comparing and relating the samples in the current frame to the location of the same object in the reference frames. Specifically, during motion estimation, the current frame or a partition thereof is compared with reference frames which may be temporally previous or forward of the current frame. A pattern of pixels within a search range set in the respective reference frame is compared with the pattern of pixels exhibited in the current frame until a reference frame is found which contains a pixel pattern best matching the pixel pattern in the current frame to be encoded. Based on the comparison results, an inter-frame displacement vector or a motion vector is estimated. Using the estimated motion vector, motion compensation yields a prediction of the current frame.

The motion vector accuracy and coding efficiency can be increased by applying interpolation to the pixels in the reference picture, which are called samples at integer positions, or simply integer samples, to increase the resolution of the reference picture. Interpolation is to generate fractional samples between each integer sample, using the values of the integer samples. The more fractional samples are generated between the integer samples, the higher the resolution of the reference picture becomes, and the more precisely and accurately a fractional sample displacement can be compensated. For example, in order to accurately compensate a movement of a moving object which is a displacement of only half a pixel, at least half-pixel (pel) interpolation is needed. Motion estimation and compensation may be performed using a number of different block sizes. Individual motion vectors may be determined for partitions having 4×4, 4×8, 8×4, 8×8, 8×16, 16×8 or 16×16 pixels. The provision of small motion compensation partitions improves the ability to handle fine motion details.

H.264/AVC takes a 2-step approach and achieves motion compensation up to a quarter-pel resolution. In H.264/AVC, the first step uses a 6-tap filter to generate intermediate values at a half-pel resolution from the values of surrounding integer samples. In the second step, the values of integer samples and the intermediate values are averaged or the intermediate values are averaged among themselves to generate fractional samples at quarter-pel positions, or simply quarter-pel samples. In B slices, two predictions fractional samples from two predictions may further be averaged. Please note, however, that multiple averaging operations, when cascaded, introduce rounding errors which adversely affects the accuracy and the efficiency of motion compensation. Proposals D321 and E242 of Joint Collaborative Team on Video Coding (JCT-VC) address the rounding error issue associated with bi-directional averaging. These documents propose that a rounding operation be limited to taking place at the last step of bi-directional averaging after two predictions are added.

JCT-VC Draft E603 discloses the use of an 8-tap filter to achieve the quarter-pel resolution. In E603, some of the quarter-pel samples are derived by applying an 8-tap filter to the nearest integer samples and truncating the filtered results down to a predetermined bit depth. The rest of the quarter-pel samples are derived through two processes. In the first process, intermediate values are derived by applying the 8-tap filter to the nearest integer samples in the vertical direction. In the second process, the 8-tap filter is applied to the intermediate values in the horizontal direction and the filtered results are truncated to a predetermined bit depth. This 2-process approach is advantageous in that there is required no fixed order for the vertical filtering and the horizontal filtering in the second process, and thus no signaling to a decoder is necessary regarding the order of the vertical filtering and the horizontal filtering in the second process. However, the motion compensation discussed in E603 requires the definition of additional filtering operations to generate the intermediate values. The filtering operation applied to the intermediate values is costly and requires high computation complexity, in particular for video data with a high bit depth.

Further, in the motion compensation discussed in E603, the intermediate values are not truncated so as to assure the accuracy of the quarter-pel samples calculated therefrom. Thus, the bitwise precision of the calculated values is not constant during the motion compensation discussed in E603. At the end of the first process explained above, the precision of the resultant sample values is increased by an amount determined by the gain of the 8-tap filter. By applying the 8-tap filter to the intermediate values, the precision is then increased again by the same amount as in the first process before truncation to a predetermined precision. Therefore, twice as much truncation of the resolution is needed in the second process as is needed in the first process in order to bring the resolution back to the original bit depth at the end of the second step.

SUMMARY OF THE INVENTION

In view of the above discussed prior art, the present invention provides a novel motion compensation operation for an inter-frame prediction. The motion compensation applies a fractional sample interpolation on samples to generate fractional samples. In the motion compensation according to the present invention, a first fractional sample interpolation is applied on samples in a first direction to generate a first set of fractional samples. A second fractional sample interpolation is applied on the first set of fractional samples in a second direction to generate a second set of fractional samples. In the present invention, the first set of fractional samples is represented with a precision independent of a precision of representation of the samples.

In an aspect of the present invention, the fractional sample interpolation applies an 8-tap FIR filter having one of the following three sets of coefficients to generate a quarter-pel sample:

[−1, 4, −10, 58, 17, −5, 1, 0];
[−1, 4, −11, 40, 40, −11, 4, −1]; and
[0, 1, −5, 17, 58, −10, 4, −1].

In an aspect of the present invention, the fractional sample interpolation comprises truncating each of filtered results so that the fractional samples have a desired precision. The desired precision may be constant throughout the first and second fractional interpolation processes.

The truncating process may involve rounding truncated results towards minus infinity. This is achieved by not adding any offset to the filtered results before the truncating process.

Further in another aspect of the present invention, the samples may be scaled up to a second bit depth which is constant for the samples, regardless of the original bit depths of the samples. The second bit depth may be set equal to a number of bits available to represent the sample, and a scaling up factor is set equal to the number of bits available to represent the sample minus the original bit depth of the sample.

Further in another aspect of the present invention, the scaled up samples are subtracted with an offset.

BRIEF DESCRIPTION OF THE DRAWINGS

FIG. 7 is an illustration of filtering for fractional sample interpolation.

DETAILED DESCRIPTION OF THE DRAWINGS AND THE PRESENTLY PREFERRED EMBODIMENTS

Figure 1:
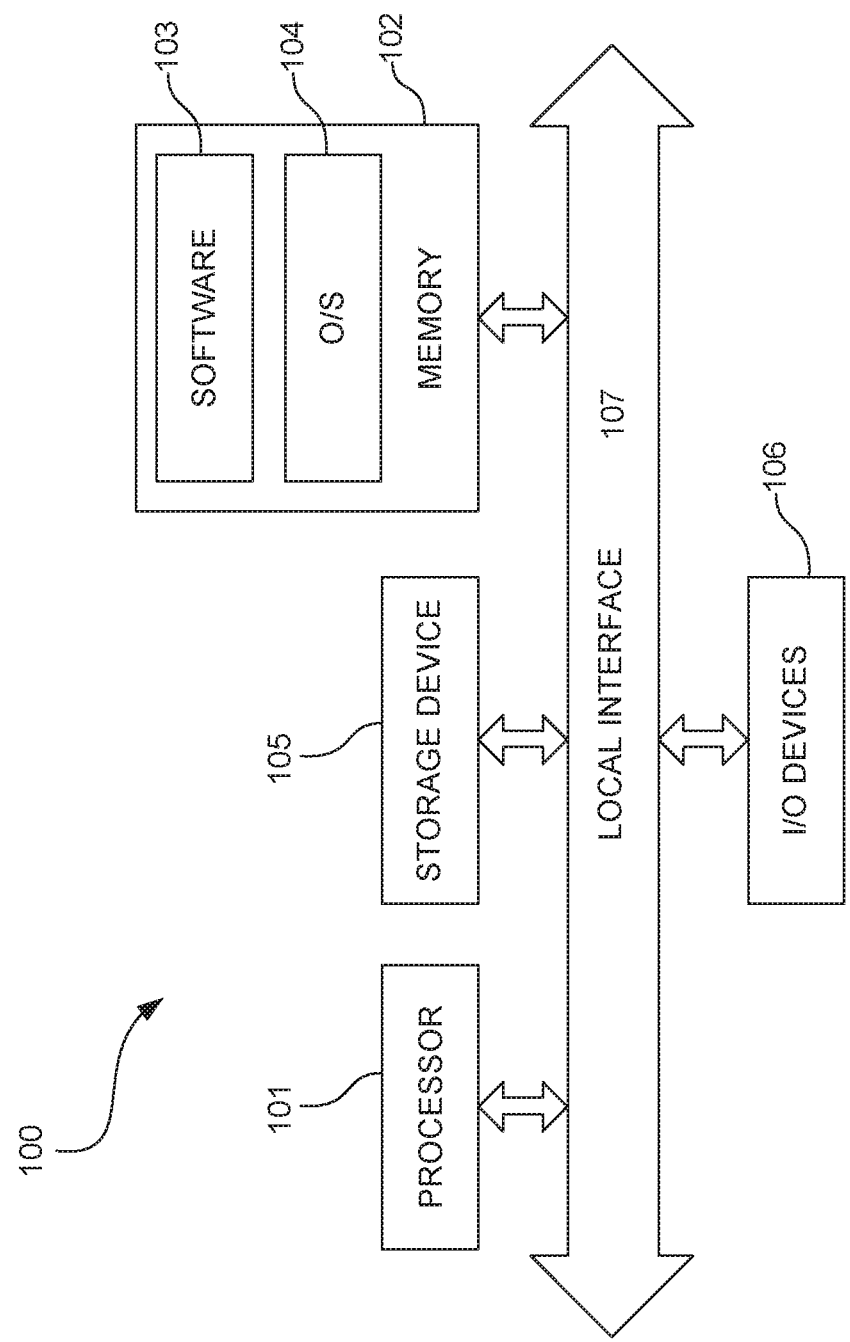
FIG. 1 is a block diagram showing an exemplary hardware architecture on which the present invention may be implemented.

FIG. 1 shows an exemplary hardware architecture of a computer 100 on which the present invention may be implemented. Please note that the hardware architecture shown in FIG. 1 may be common in both a video encoder and a video decoder which implement the embodiments of the present invention. The computer 100 includes a processor 101, memory 102, storage device 105, and one or more input and/or output (I/O) devices 106 (or peripherals) that are communicatively coupled via a local interface 107. The local interface 107 can be, for example, but not limited to, one or more buses or other wired or wireless connections, as is known in the art.

The processor 101 is a hardware device for executing software, particularly that stored in the memory 102. The processor 101 can be any custom made or commercially available processor, a central processing unit (CPU), an auxiliary processor among several processors associated with the computer 100, a semiconductor based microprocessor (in the form of a microchip or chip set), or generally any device for executing software instructions.

The memory 102 comprises a computer readable medium, which can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 102 may incorporate electronic, magnetic, optical, and/or other types of storage media. A computer readable medium can be any means that can store, communicate, propagate or transport the program for use by or in connection with the instruction execution system, apparatus or device. Please note that the memory 102 can have a distributed architecture, where various components are situated remote from one another, but can be accessed by the processor 101.

The software 103 in the memory 102 may include one or more separate programs, each of which contains an ordered listing of executable instructions for implementing logical functions of the computer 100, as described below. In the example of FIG. 1, the software 103 in the memory 102 defines the computer 100's video encoding or video decoding functionality in accordance with the present invention. In addition, although not required, it is possible for the memory 102 to contain an operating system (O/S) 104. The operating system 104 essentially controls the execution of computer programs and provides scheduling, input-output control, file and data management, memory management, and communication control and related services.

The storage device 105 of the computer 100 may be one of many different types of storage device, including a stationary storage device or portable storage device. As an example, the storage device 105 may be a magnetic tape, disk, flash memory, volatile memory, or a different storage device. In addition, the storage device 105 may be a secure digital memory card or any other removable storage device 105.

The I/O devices 106 may include input devices, for example, but not limited to a touch screen, a keyboard, mouse, scanner, microphone or other input device. Furthermore, the I/O devices 106 may also include output devices, for example, but not limited to a display or other output devices. The I/O devices 106 may further include devices that communicate via both inputs and outputs, for instance, but not limited to a modulator/demodulator (e.g., a modem; for accessing another device, system, or network), a radio frequency (RF), wireless or other transceiver, a telephonic interface, a bridge, a router or other devices that function both as an input and an output.

As is well known by those having ordinary skill in the art, video compression is achieved by removing redundant information in a video sequence. Many different video coding standards exist, examples of which include MPEG-1, MPEG-2, MPEG-4, H.261, H.263, and H.264/AVC. It should be noted that the present invention is not intended to be limited in application of any specific video coding standard. However, the following description of the present invention is provided, using the example of H.264/AVC standard, which is incorporated herein by reference. H.264/AVC is the newest video coding standard and achieves a significant performance improvement over the previous coding standards such as MPEG-1, MPEG-2, H.261 and H.263.

In H.264/AVC, each frame or picture of a video can be broken into several slices. The slices are then divided into blocks of 16×16 pixels called macroblocks, which can then be further divided into blocks of 8×16, 16×8, 8×8, 4×8, 8×4, down to 4×4 pixels. There are five types of slices supported by H.264/AVC. In I slices, all the macroblocks are coded using intra-prediction. In P slices, macroblocks can be coded using intra- or inter-prediction. P slices allow only one motion compensated prediction (MCP) signal per macroblock to be used. In B slices, macroblocks can be coded using intra or inter-prediction. Two MCP signals may be used per prediction. SP slices allow P slices to be switched between different video streams efficiently. An SI slice is an exact match for an SP slice for random access or error recovery, while using only intra-prediction.

Figure 2:
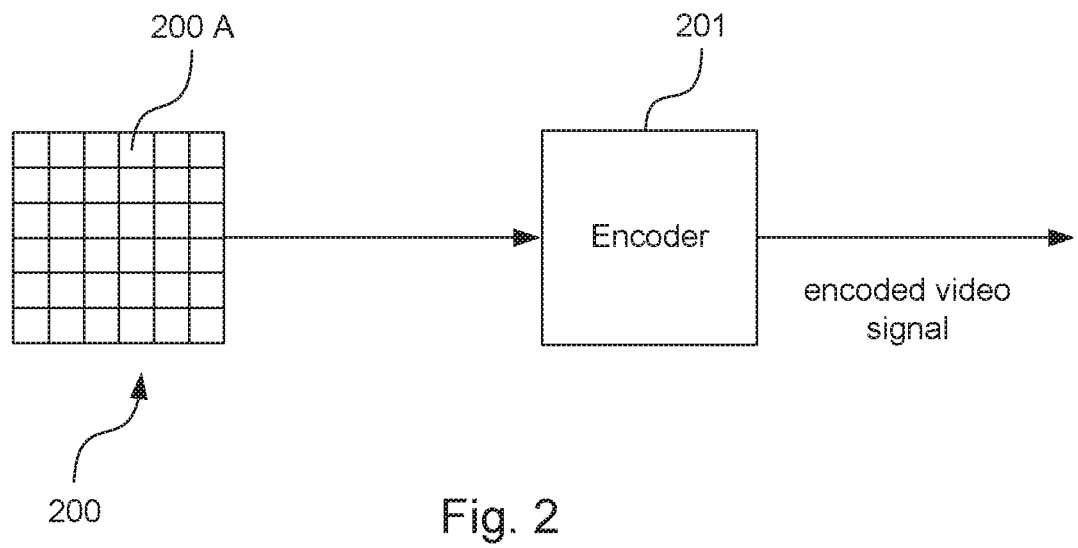
FIG. 2 is a block diagram showing a general view of a video encoder to which the present invention may be applied.

FIG. 2 shows a general view of a video encoder to which the present invention may be applied. The blocks shown in the figure represent functional modules realized by the processor 101 executing the software 103 in the memory 102. A picture of video frame 200 is fed to a video encoder 201. The video encoder treats the picture 200 in units of macroblocks 200A. Each macroblock contains several pixels of picture 200. On each macroblock, a transformation into transform coefficients is performed followed by a quantization into transform coefficient levels. Moreover, intra-prediction or inter-prediction is used, so as not to perform the coding steps directly on the pixel data but on the differences between pixel values and their predictions, thereby achieving small values which are more easily compressed.

For each slice, the encoder 201 generates a number of syntax elements, which form a coded version of the macroblocks of the respective slice. All residual data elements in the syntax elements, which are related to the coding of transform coefficients, such as the transform coefficient levels or a significance map indicating transform coefficient levels skipped, are called residual data syntax elements. Besides these residual data syntax elements, the syntax elements generated by the encoder 201 contain control information syntax elements containing control information as to how each macroblock has been encoded and has to be decoded, respectively. In other words, the syntax elements are dividable into two categories. The first category, the control information syntax elements, contains the elements related to a macroblock type, sub-macroblock type and information on prediction modes both of a spatial and temporal types, as well as slice-based and macroblock-based control information, for example. In the second category, all residual data elements, such as a significance map indicating the locations of all significant coefficients inside a block of quantized transform coefficients and the values of the significant coefficients, which are indicated in units of levels corresponding to the quantization steps, are combined and become residual data syntax elements.

The encoder 201 comprises an entropy coder which encodes syntax elements and generates arithmetic codewords for each slice. When generating the arithmetic codewords for a slice, the entropy coder exploits statistical dependencies among the data values of syntax elements in the video signal bit stream. The encoder 201 outputs an encoded video signal for a slice of picture 200 to a video decoder 301 shown in FIG. 3.

Figure 3:
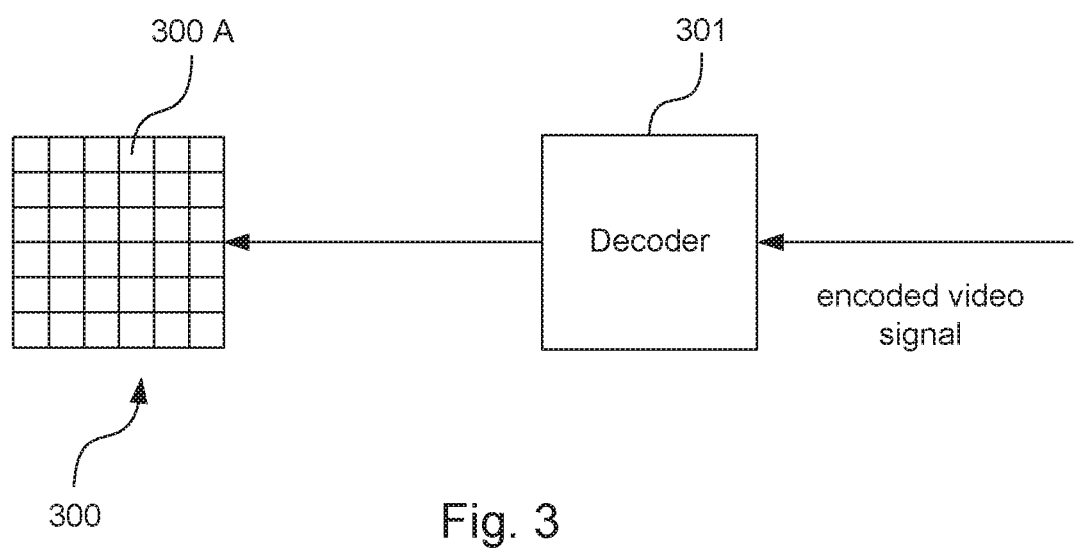
FIG. 3 is a block diagram showing a general view of a video decoder to which the present invention may be applied.

FIG. 3 shows a general view of a video decoder to which the present invention may be applied. Likewise, the blocks shown in the figure represent functional modules realized by the processor 101 executing the software 103 in the memory 102. The video decoder 301 receives the encoded video signal and first entropy-decodes the signal back into the syntax elements. The decoder 301 uses the syntax elements in order to reconstruct, macroblock by macroblock and then slice after slice, the picture samples 300A of pixels in the picture 300.

Figure 4:
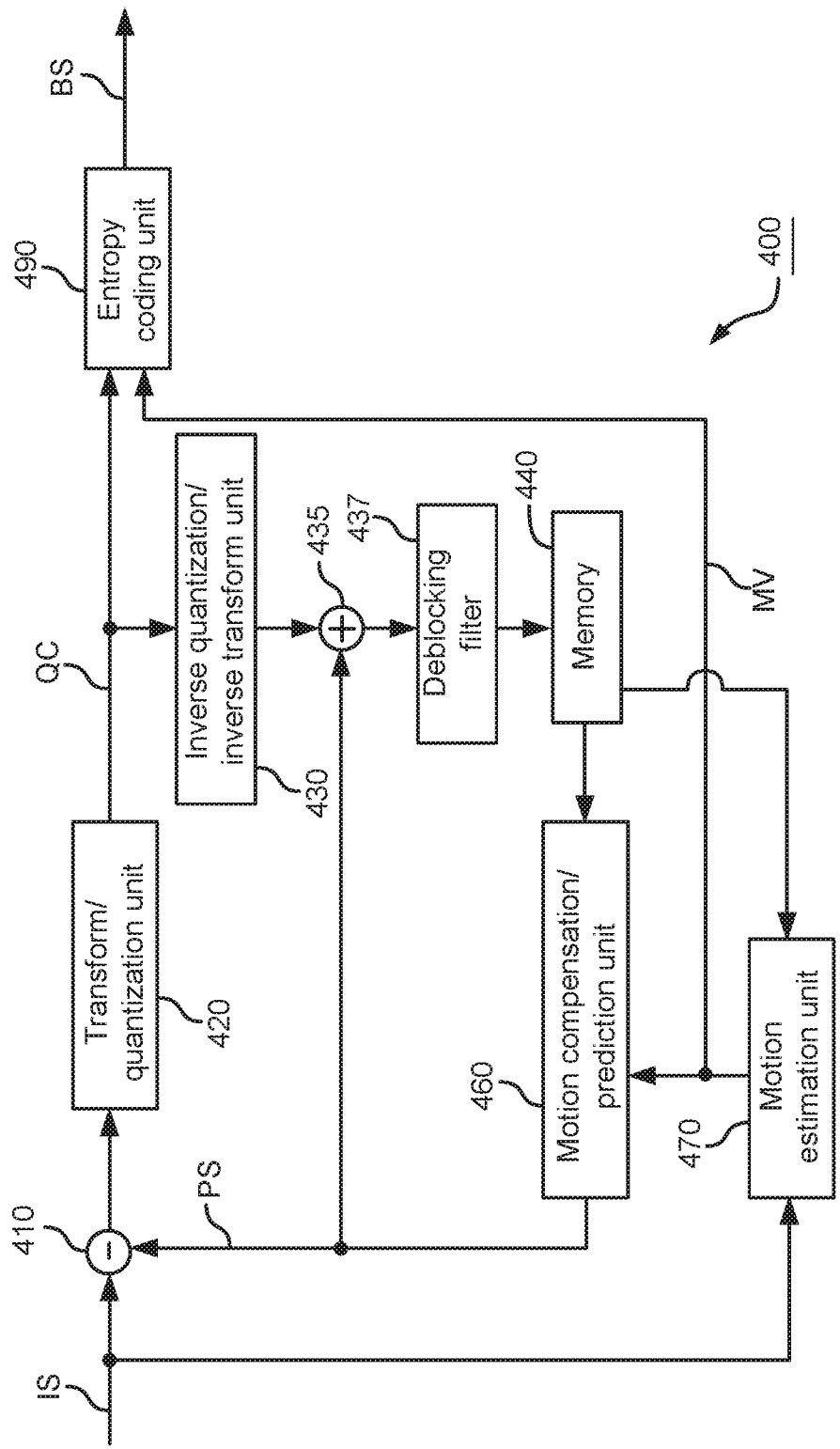
FIG. 4 is a block diagram showing the functional modules of an encoder according to an embodiment of the present invention.

FIG. 4 shows the functional modules of the video encoder 201, which is generally denoted with reference numeral 400 in FIG. 4. These functional modules are realized by the processor 101 executing the software 103 in the memory 102. An input video picture is a frame or a field of a natural (uncompressed) video image defined by sample points representing components of original colors, such as chrominance ("chroma") and luminance ("luma"). Other components are possible such as hue, saturation and value. The input video picture is divided into macroblocks that each represent a square picture area consisting of 16×16 pixels of the luma component of the picture color. The input video picture is also partitioned into macroblocks that each represent 8×8 pixels of each of the two chroma components of the picture color. In the general encoder operation, inputted macroblocks may be temporally or spatially predicted using inter- or intra-prediction. It is, however, assumed for the purpose of discussion that the macroblocks 400 are either all P-slice type macroblocks or all B-slice type macroblocks, or a mix of both, and subjected only to inter-prediction.

The video encoder 400 shown in FIG. 4 only transmits residuals or differentials between a current picture and a prediction of the current picture. A subtractor 410 obtains these residuals by receiving a block of current picture to be encoded as an input signal IS and subtracting therefrom a block of prediction picture indicated by a prediction signal PS. As illustrated in FIG. 4, the video encoder 400 includes a transform/quantization unit 420 to output quantized transform coefficients QC. The transform/quantization unit 420 transforms the residual from the spatial domain into the frequency domain and quantizes the transformed residual. The video encoder 400 also includes an entropy coding unit 490 for performing entropy coding (variable length coding) of the quantized transform coefficients QC and outputting the bit stream BS.

The video encoder 400 further includes an inverse quantization/transform unit 430, and an adder 435. The inverse quantization/transform unit 430 transforms the quantized transform coefficients QC back into a residual signal RS, to which the adder 435 adds the prediction signal PS to output a decoded picture. A deblocking filter 437 removes block artifacts from the decoded picture and stores the cleaned decoded picture in a reference memory 440.

The video encoder 400 further includes a motion compensation/prediction unit 460 and a motion estimation unit 470. The motion compensation/prediction unit 460 reads a reference picture from the reference memory 440 and applies interpolation to generate fractional samples at the quarter-pel positions. The motion estimation unit 470 also reads the reference picture from the reference memory 440 and estimates a motion vector MV for the current picture by comparing the current picture and the reference picture. The motion vector MV is outputted to the motion compensation/prediction unit 460 and the entropy coding unit 490. The block may be divided into partitions having 4×4, 4×8, 8×4, 8×8, 8×16, 16×8 or 16×16 pixels. The motion estimation unit 470 performs the motion estimation on the respective partitions in the block and outputs motion vectors MV for the respective partitions. The motion compensation/prediction unit 460 displaces the respective partitions in the reference picture by the amounts and in the directions indicated by the motion vectors to derive the prediction picture, which is provided as the predictive signal IS to the subtractor 410 and the adder 435.

Figure 5:
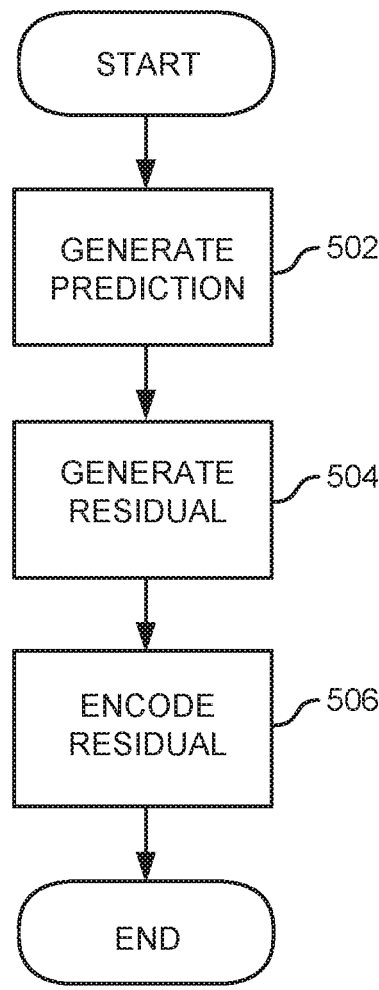
FIG. 5 is a flowchart showing an encoding process performed by the video encoder according to an embodiment of the present invention.

FIG. 5 is a flowchart showing a high level of encoding process performed by the video encoder 400. In Step 502, the motion compensation/prediction unit 460 generates a prediction block. In Step 504, the subtractor 410 subtracts the prediction picture from the current picture to obtain a residual. In Step 506, the transform/quantization unit 420 encodes the residual.

Figure 6:
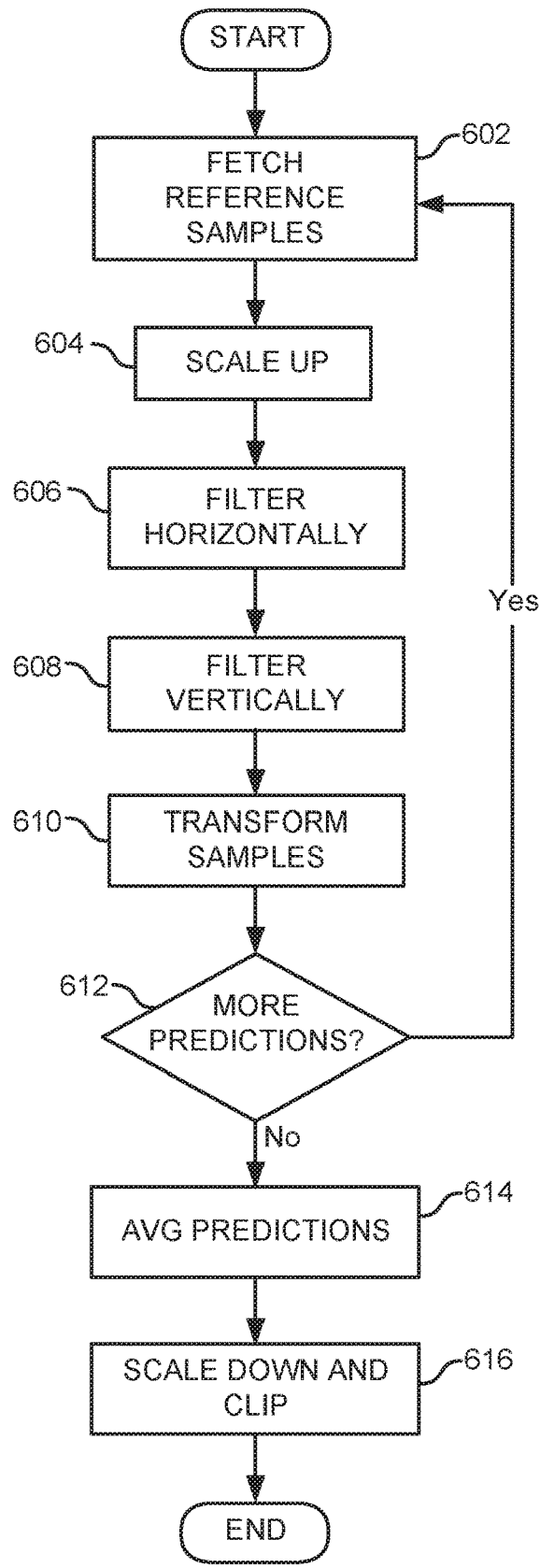
FIG. 6 is a flowchart showing the processes of fractional sample interpolation according to an embodiment of the present invention.

FIG. 6 is a flowchart showing the processes of motion compensation performed by the motion compensation/prediction unit 460 to generate a prediction signal according to an embodiment of the present invention. In Step 602, the motion compensation/prediction unit 460 reads out reference samples from the reference memory 440. The reference memory 440 stores multiple reference pictures. As discussed in Section 8.4.2 and its subsections of H.264/AVC, the location of the reference samples to be retrieved from a reference picture stored in the reference memory 440 may be determined with the position of an area to be predicted within the current picture, a motion vector MV of the area, and a reference frame index.

In Step 604, the retrieved reference samples are scaled up to increase the precision of the reference samples. The scaling factor may be determined with the bit depth of the reference samples and the number of bits available to represent the reference sample. The number of bits available to represent the reference sample may be determined such that, if 16 is the maximum available number of bits for representation of the reference sample, the number of bits available to represent the sample may be limited to 14 to prevent an overflow or underflow of data, which may occur during the motion compensation. If the number of bits available to represent the sample is 14, the scaling factor is 6 for the reference sample which is 8 bits wide, and the retrieved reference samples are scaled up by left-shifting their bits by 6 bits. The scaling factor should be 4 for the reference sample which is 10 bits wide, and the retrieved reference samples are scaled up by left-shifting their bits by 4 bits. More generally, the scaling factor may be expressed by "the number of bits available to represent the reference sample" minus "the bit depth of the reference sample." The scaling up process performed in Step 604 is advantageous because it converts reference samples stored in the reference memory in a form independent from their bit depths and the processes following the scaling up process will become independent from the original bit depths of the video data.

Optionally, an offset may be subtracted from the scaled-up value of the reference sample. For example, if a signed 14-bit representation is used to represent the scaled-up reference samples, the value of the offset to be subtracted may be 8192 ($=2^{13}$), which brings the scaled-up reference samples within the range of −8192 to 8192. Adding this offset is beneficial for reducing the number of bits required to represent a sample. Since the interpolation process described below deals with signed sample values, a signed representation of all sample values is thus preferred. In the example above in which samples are scaled up to 14-bit representations, if the offset is not subtracted, a 15-bit signed representation would have to be used which is more costly than a 14-bit signed representation obtained from subtracting the offset. Please note that the reference samples may be scaled up and offset when they are stored in the reference memory. If the reference samples are stored in the reference memory after scaled up and offset, Step 604 is not necessary.

The resolution of the scaled-up reference samples is then increased using fractional sample interpolation to generate fractional samples at quarter-pel positions. FIG. 7 is an illustration of filtering for fractional sample motion compensation. In FIG. 7, the upper-case letters $A_{i,j}$ denote the scaled-up reference samples. These samples are called integer samples. The other samples shown by the lower-case letters, such as $a_{0,0}$, $b_{0,0}$, $c_{0,0}$, $d_{0,0}$ ... and $r_{0,0}$, are fractional samples at quarter-pel positions. In Step 606, the quarter-pel sample $a_{0,0}$, $b_{0,0}$ or $c_{0,0}$ is derived by the following interpolation equations:

$$a_{0,0}=(-A_{-3,0}+4*A_{-2,0}-10*A_{-1,0}+58*A_{0,0}+17*A_{1,0}-5*A_{2,0}+A_{3,0})>>6$$

$$b_{0,0}=(-A_{-3,0}+4*A_{-2,0}-11*A_{-1,0}+40*A_{0,0}+40*A_{1,0}-11*A_{2,0}+4*A_{3,0}-A_{4,0})>>6$$

$$c_{0,0}=(A_{-2,0}-5*A_{-1,0}+17*A_{0,0}+58*A_{1,0}-10*A_{2,0}+4*A_{3,0}-A_{4,0})>>6$$

The fractional part of the horizontal component of the motion vector determines which sample is derived. For example if the fractional part is ¼, $a_{0,0}$ is derived.

Each of the interpolation operations includes applying an 8-tap FIR filter to the nearest integer samples and truncating the filtered result to offset the filter gain. A sum of the coefficients of each filter is set equal to 64 ($=2^6$). Thus, the truncating operation includes dividing the filtered result by 64 or right-shifting the filtered result by 6. Please note that in the above interpolation operations, the truncated results are rounded towards minus infinity. By adding an offset to the filtered results, the truncated results may be rounded towards the nearest integer. However, rounding towards minus infinity is advantageous because it does not require adding the offset to the filtered results. Optionally, different types of filters may be provided from which one filter is applied selectively, depending on a fractional displacement specified by the horizontal component of a motion vector. This step may be omitted in the case where the horizontal fractional displacement is zero. Please also note that there is a shift-right operation by 6 bits in Step 606, and a shift-left operation by 6 bits in Step 604 in the example with 8-bit inputs. Thus, Steps 604 and 606 may be combined such that the shift-left and shift-right operations are removed without altering the output.

In Step 608, the fractional sample $d_{0,0}$, $h_{0,0}$, $n_{0,0}$, $e_{0,0}$, $i_{0,0}$, $p_{0,0}$, $f_{0,0}$, $j_{0,0}$, $q_{0,0}$, $g_{0,0}$, $k_{0,0}$ or $r_{0,0}$ is derived by the following interpolation equations:

$$d_{0,0}=(-A_{0,-3}+4*A_{0,-2}-10*A_{0,-1}+58*A_{0,0}+17*A_{0,1}-5*A_{0,2}+A_{0,3})>>6$$

$$h_{0,0}=(-A_{0,-3}+4*A_{0,-2}-11*A_{0,-1}+40*A_{0,0}+40*A_{0,1}-11*A_{0,2}+4*A_{0,3}-A_{0,4})>>6$$

$$n_{0,0}=(A_{0,-2}-5*A_{0,-1}+17*A_{0,0}+58*A_{0,1}-10*A_{0,2}+4*A_{0,3}-A_{0,4})>>6$$

$$e_{0,0}=(-a_{0,-3}+4*a_{0,-2}-10*a_{0,-1}+58*a_{0,0}+17*a_{0,1}-5*a_{0,2}+a_{0,3})>>6$$

$$i_{0,0}=(-a_{0,-3}+4*a_{0,-2}-11*a_{0,-1}+40*a_{0,0}+40*a_{0,1}-11*a_{0,2}+4*a_{0,3}-a_{0,4})>>6$$

$$p_{0,0}=(a_{0,-2}-5*a_{0,-1}+17*a_{0,0}+58*a_{0,1}-10*a_{0,2}+4*a_{0,3}-a_{0,4})>>6$$

$$f_{0,0}=(-b_{0,-3}+4*b_{0,-2}-10*b_{0,-1}+58*b_{0,0}+17*b_{0,1}-5*b_{0,2}+b_{0,3})>>6$$

$$j_{0,0}=(-b_{0,-3}+4*b_{0,-2}-11*b_{0,-1}+40*b_{0,0}+40*b_{0,1}-11*b_{0,2}+4*b_{0,3}-b_{0,4})>>6$$

$$q_{0,0}=(b_{0,-2}-5*b_{0,-1}+17*b_{0,0}+58*b_{0,1}-10*b_{0,2}+4*b_{0,3}-b_{0,4})>>6$$

$$g_{0,0}=(-c_{0,-3}+4*c_{0,-2}-10*c_{0,-1}+58*c_{0,0}+17*c_{0,1}-5*c_{0,2}+c_{0,3})>>6$$

$$k_{0,0}=(-c_{0,-3}+4*c_{0,-2}-11*c_{0,-1}+40*c_{0,0}+40*c_{0,1}-11*c_{0,2}+4*c_{0,3}-c_{0,4})>>6$$

$$r_{0,0}=(c_{0,-2}-5*c_{0,-1}+17*c_{0,0}+58*c_{0,1}-10*c_{0,2}+4*c_{0,3}-c_{0,4})>>6$$

The fractional parts of the horizontal and vertical components of the motion vector determine which sample is derived. For example if the horizontal fractional part is ¼ and the vertical fractional part is ¾, $p_{0,0}$ is derived.

The above interpolation operations include applying 8-tap FIR filters vertically to the samples $A_{0,i}$, $a_{0,i}$, $b_{0,i}$ and $c_{0,i}$, where $i=-3..4$, and truncating the filtered results by a factor of 6. Please note that in the present invention, every filtered result is truncated and that no filtered result is used as an untruncated intermediate value to calculate fractional samples therefrom. In the present invention, therefore, the precision of the samples values is constant throughout the fractional sample interpolation. Neither step 606 nor step 608 alters the precision in the representation of samples.

In the above embodiment of fractional sample interpolation, the sets of filters used in the vertical and horizontal filtering operations are all 8-tap filters. It should be noted that filters with different tap numbers may be used for the fractional motion interpolation. For example, it is desirable to use filters with fewer taps for smaller block sizes. The use of filters with fewer taps reduces the number of samples to be retrieved from the reference memory, whereby the memory bandwidth can be reduced. The use of filters with fewer taps also reduces the number of multiplications in the filtering operations and improves the efficiency of motion compensation. H.264/AVC allows a macroblock or sub-macroblock to be divided into one or more partitions for the purpose of motion compensation. In H.264/AVC, a macroblock having a size of 16×16 may be divided into one or more partitions each having a size of 4×4, 4×8, 8×4, 8×8, 8×16 or 16×8. Accordingly, filters with a different number of taps may be prepared and applied selectively according to the width of a partition. For example, an 8-tap filter may be applied to partitions having a width equal to or larger than 8, and a 4-tap filter may be applied to partitions having a width smaller than 8. In one embodiment, such a 4-tap filter has coefficients [−4 36 36 −4]. JCT-VC Draft E603 has introduced the concept of a coding unit (CU). A CU having a size of N×N may be divided into one or more partitions having a size of N×N, N×N/2 or N/2×N. Filters with different tap numbers may be applied selectively whether the height or width of a CU is N or N/2.

In the above embodiment of fractional sample motion compensation, the horizontal fractional sample interpolation (Step 606) precedes the vertical fractional sample interpolation (Step 608). It should be noted that the order may be switched as long as the order is agreed upon in advance between an encoder and a decoder. In another embodiment, the order may be signaled from an encoder to a decoder. When the references samples are 8 bits wide, the result of calculation will be the same irrespective of the order of horizontal and vertical interpolation. If it is the case, no prior agreement is needed between an encoder and a decoder regarding the order.

In the motion compensation discussed in JCT-VC Draft E603, the same fractional samples can be derived whether the intermediate values are derived vertically and applied horizontally or derived horizontally and applied vertically. This is beneficial in a sense that there is no prior agreement is necessary between an encoder and a decoder regarding whether the intermediate values should be derived vertically and applied horizontally or derived horizontally and applied vertically. However, the intermediate values have higher precision than in the present invention and the cost of applying a second FIR filter to these intermediate values is higher than that of the present invention. Generally, the cost increases in proportion to the precision. This cost may be significantly higher in software where the precision exceeds a common word size such as 16 bits. In such a case the precision is further extended to match the next common word size. For example, intermediate values with 17 bits of precision would be extended to 32 bits. The higher precision of intermediate values as discussed in JCT-VC Draft E603 does have a significant cost impact, without providing a significant benefit in terms of accuracy of the prediction signal.

In the embodiment of the present invention described above, the order of the horizontal and vertical interpolations needs to be fixed between an encoder and a decoder. However, fixing the order of the horizontal and vertical interpolations will not cause any cost to the encoder and the decoder. Rather, by fixing the order, the motion compensation can operate at a lower, yet sufficiently high, precision to lower the cost of operations such as multiplications. Also, by fixing the order, the calculation precision becomes constant throughout the fractional sample interpolation. The filtering calculation can thus be simplified in that all the multiplications between samples and coefficients can be performed within fixed bit ranges, for example, a 16-bit signed range for samples and an 8-bit singed range for filter coefficients. Since all the multiplications are performed within fixed bit ranges, the filtering operations can efficiently be implemented in parallel on SIMD architectures.

Turning back to FIG. 6, a transformation is applied to the derived samples in Step 610. An example of such a transformation is described as a weighted sample prediction process in Section 8.4.2.3 and its subsections of H.264/AVC. The weighted sample prediction process combines two sets of samples by a linear interpolation. The transformation can improve coding efficiency for scenes containing fades. The value of the combined samples resulting from the transformation may be clipped to fit within a specified range, e.g. 16-bit signed range. Please note that Step 610 can be omitted where no such transformation is necessary.

It is then checked in Step 612 whether another prediction needs to be generated for motion compensation. For example, when bidirectional averaging is to be performed, two predictions need to be generated for averaging thereof. If it is determined that another prediction is needed, the process returns to Step 602. In Step 614, two predictions are averaged to generate a bidirectional prediction. If bidirectional averaging is not instructed, Step 614 is skipped.

In Step 616, a generated prediction is scaled down and clipped to a valid range. The scaling down operation performed in Step 616 undoes the scaling up operation performed in Step 604 and right-shifts the generated prediction by the same number of bits as used to left-shift the samples in Step 604. It is preferable to add a rounding offset before the right-shift operation to round the scaled down value towards the nearest integer. If the offset is subtracted from a sample in Step 604, the same offset is added to the prediction. The valid range to which the prediction is clipped is typically defined as {0 . . . 255}, where the stored reference samples are 8 bits wide. Generally, the valid range may be defined as $\{0 \ldots 2^M-1\}$ for reference samples which are M bits wide.

In a practical implementation of the present invention, the steps need not be performed separately as shown in FIG. 6, and some steps may be combined. For example, shifting operations performed separately in steps of FIG. 6 may be combined. An example is that the right-shift operation included in the bidirectional averaging performed in Step 614 and the right-shift operation included in scaling down performed in Step 616 may be combined. Further, multiple functions or circuits may be implemented for circumstances where processes can be simplified, for example, where there are no fractional displacements and thus FIR filtering is not required.

Figure 8:
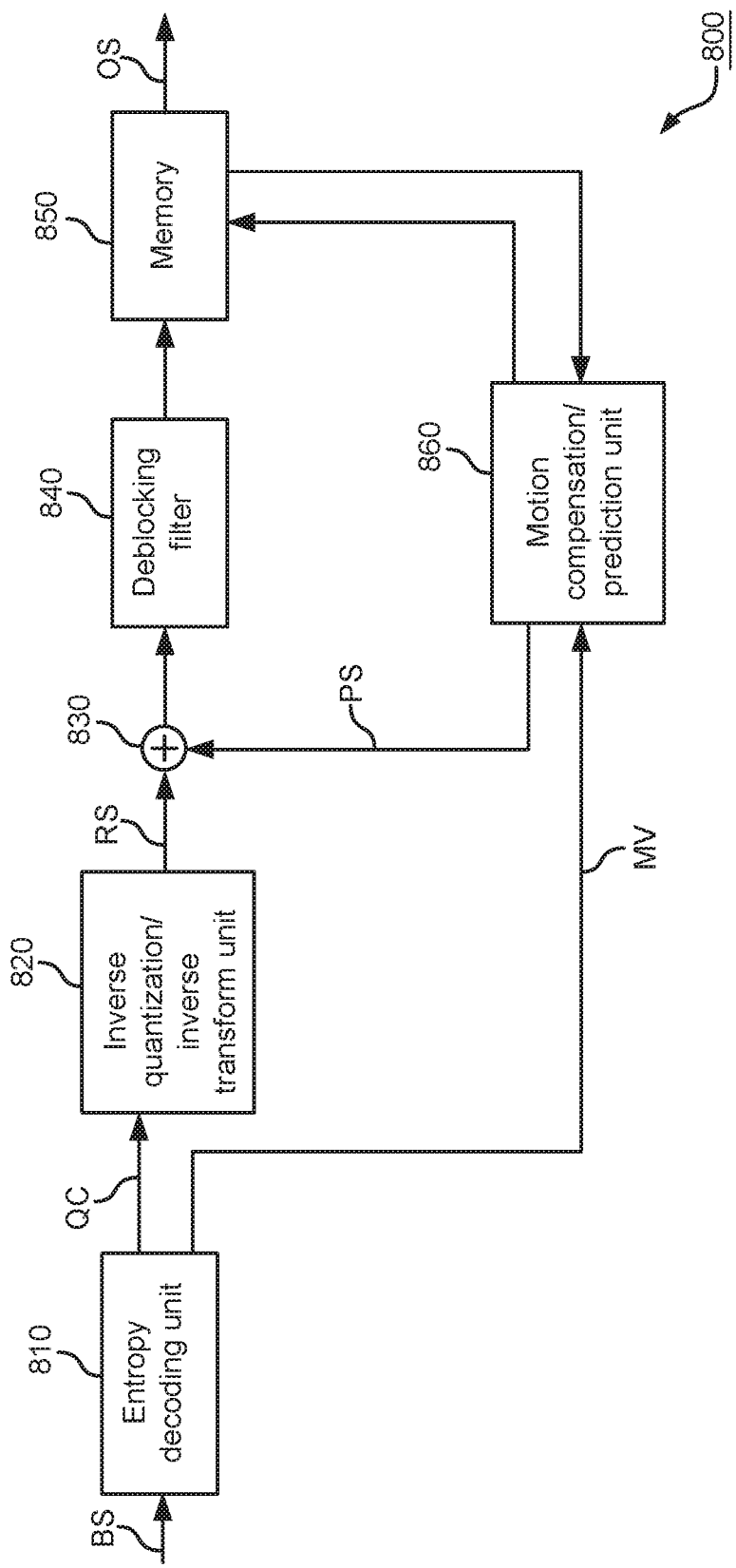
FIG. 8 is a block diagram showing the functional modules of a decoder according to an embodiment of the present invention.

FIG. 8 shows the functional modules of the video decoder 301, which is generally denoted with reference numeral 800 in FIG. 8. These functional modules are realized by the processor 101 executing the software 103 in the memory 102. In FIG. 8, an entropy decoding unit 810 obtains a bit stream BS outputted by the moving picture coding apparatus 400 and performs entropy decoding processing of the bit stream. The entropy decoding unit 810 then outputs the quantized transform coefficients QC to the inverse quantization/inverse transform unit 820. The entropy decoding unit 810 also outputs the motion vector MV to a motion compensation/prediction unit 860. The inverse quantization/inverse transform unit 820 performs decoding processing of inverse quantization and inverse DCT transform on the quantized transform coefficients QC. The inverse quantization/inverse transform unit 820 then outputs the residual signal RS.

An adder 830 adds the residual signal RS to the prediction signal PS obtained from the motion compensation unit 860 and outputs a decoded picture to a deblocking filter 840. The deblocking filter 840 eliminates block artifacts from the decoded picture and stores it in a reference memory 850. The decoded picture is retrieved from the memory 850 and outputted as an output signal OS.

The motion compensation/prediction unit 860 retrieves samples in a reference picture stored in the reference memory 850 and performs the fractional sample interpolation as shown in FIG. 7. This motion compensation/prediction unit 860 generates a prediction based on the motion vector MV and the reference picture on which the fractional sample interpolation has been performed. In this way, the motion compensation/prediction unit 860 outputs the prediction signal PS to the adder 830.

Figure 9:
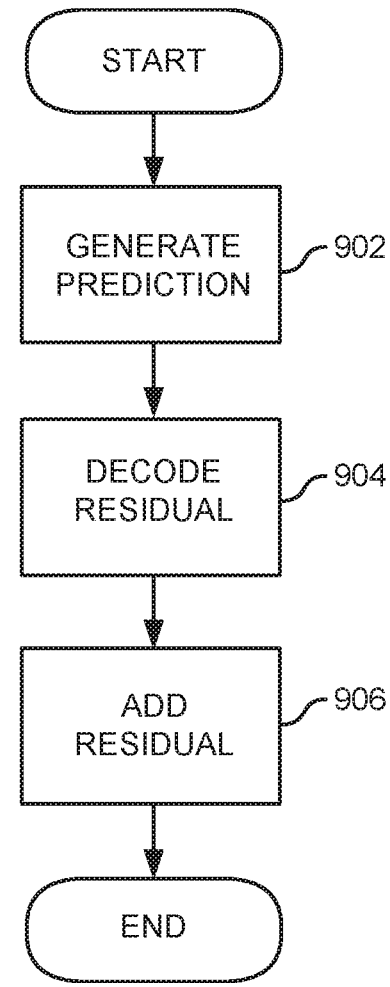
FIG. 9 is a flowchart showing a decoding process performed by the video decoder according to an embodiment of the present invention.

FIG. 9 is a flowchart showing a high level of decoding process performed by the video decoder 800. In Step 902, the motion compensation/prediction unit 860 generates a prediction block. In Step 904, the inverse quantization/inverse transform unit 820 decodes the quantized transform coefficients QC and outputs the residual signal RS. In Step 906, the adder 830 adds the residual signal RS to the prediction signal PS.

Whereas many alterations and modifications of the present invention will, no doubt, become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A video decoding method for motion compensation performed under an inter-frame prediction, the method comprising computer executable steps executed by a processor of a video decoder to implement:

retrieving a reference sample from a reference picture memory, wherein the reference sample is represented with a first bit depth;

performing a scaling up operation in which a first fractional sample interpolation is applied on the reference sample retrieved from the reference picture memory, in a first direction to generate a first set of fractional samples, wherein the first set of fractional samples are represented with a second bit depth to which the first bit depth is scaled up by a scaling-up factor, and further wherein the second bit depth is constant and set equal to a number of bits available to represent the fractional sample, and the scaling-up factor is set equal to the second bit depth minus the first bit depth and is variable to keep the second bit depth constant and independent from a change of the first bit depth;

applying a second fractional sample interpolation on the first set of fractional samples in a second direction to generate a second set of fractional samples, wherein the second set of fractional samples are represented with the second bit depth, deriving a prediction sample from the first and second sets of fractional samples, wherein the prediction sample is represented with the second bit depth; and scaling down and clipping the prediction sample from the second bit depth to the first bit depth to generate a prediction picture represented with the first bit depth, wherein the first fractional sample interpolation and the second fractional sample interpolation apply 8-tap FIR (Finite Impulse Response) filter having a set of coefficients equal to [-1, 4, -11, 40, 40, -11, 4, -1] to generate a quarter-pel sample.

2. The method according to claim 1, wherein the first fractional sample interpolation and the second fractional sample interpolation comprise truncating each filtered result so that the fractional samples have the second bit depth.

3. The method according to claim 2, wherein the second bit depth is constant throughout the first and second fractional interpolation processes.

4. The method according to claim 2, wherein truncating each filtered result comprises rounding truncated results towards minus infinity.

5. The method according to claim 1, wherein the first bit depth of the samples is set to 8 or 10.

6. The method according to claim 1, wherein the second bit depth is set to 14.

7. A video decoding device for motion compensation performed under an inter-frame prediction, the device comprising a processor programmed to:

retrieve a reference sample from a reference picture memory, wherein the reference sample is represented with a first bit depth;

performing a scaling-up operation in which a first fractional sample interpolation is applied on the reference sample retrieved from the reference picture memory, in a first direction, to generate a first set of fractional samples, wherein the first set of fractional samples are represented with a second bit depth to which the first bit depth is scaled up by a scaling-up factor, and further wherein the second bit depth is constant and set equal to a number of bits available to represent the fractional sample, and the scaling-up factor is set equal to the second bit depth minus the first bit depth and is variable to keep the second bit depth constant and independent from a change of the first bit depth;

apply a second fractional sample interpolation on the first set of fractional samples in a second direction to generate a second set of fractional samples, wherein the second set of fractional samples are represented with the second bit depth;

derive a prediction sample from the first and second sets of fractional samples, wherein the prediction sample is represented with the second bit depth; and scale down and clip the prediction sample from the second bit depth to the first bit depth to generate a prediction picture represented with the first bit depth, wherein the first fractional sample interpolation and the second fractional sample interpolation apply an 8-tap FIR (Finite Impulse Response) filter having a set of coefficients equal toat least [-1, 4, -11, 40, 40, -11, 4, -1] to generate a quarter-pel sample.

* * * * *

UNITED STATES PATENT AND TRADEMARK OFFICE
CERTIFICATE OF CORRECTION

PATENT NO. : 10,721,481 B2
APPLICATION NO. : 16/206664
DATED : July 21, 2020
INVENTOR(S) : Frank Jan Bossen Page 1 of 1

It is certified that error appears in the above-identified patent and that said Letters Patent is hereby corrected as shown below:

In the Claims

In Column 14, Claim 7, Line 28, delete "toat least" and replace with --to--.

Signed and Sealed this
Twenty-second Day of September, 2020

Andrei Iancu
*Director of the United States Patent and Trademark Office*